UNITED STATES PATENT OFFICE.

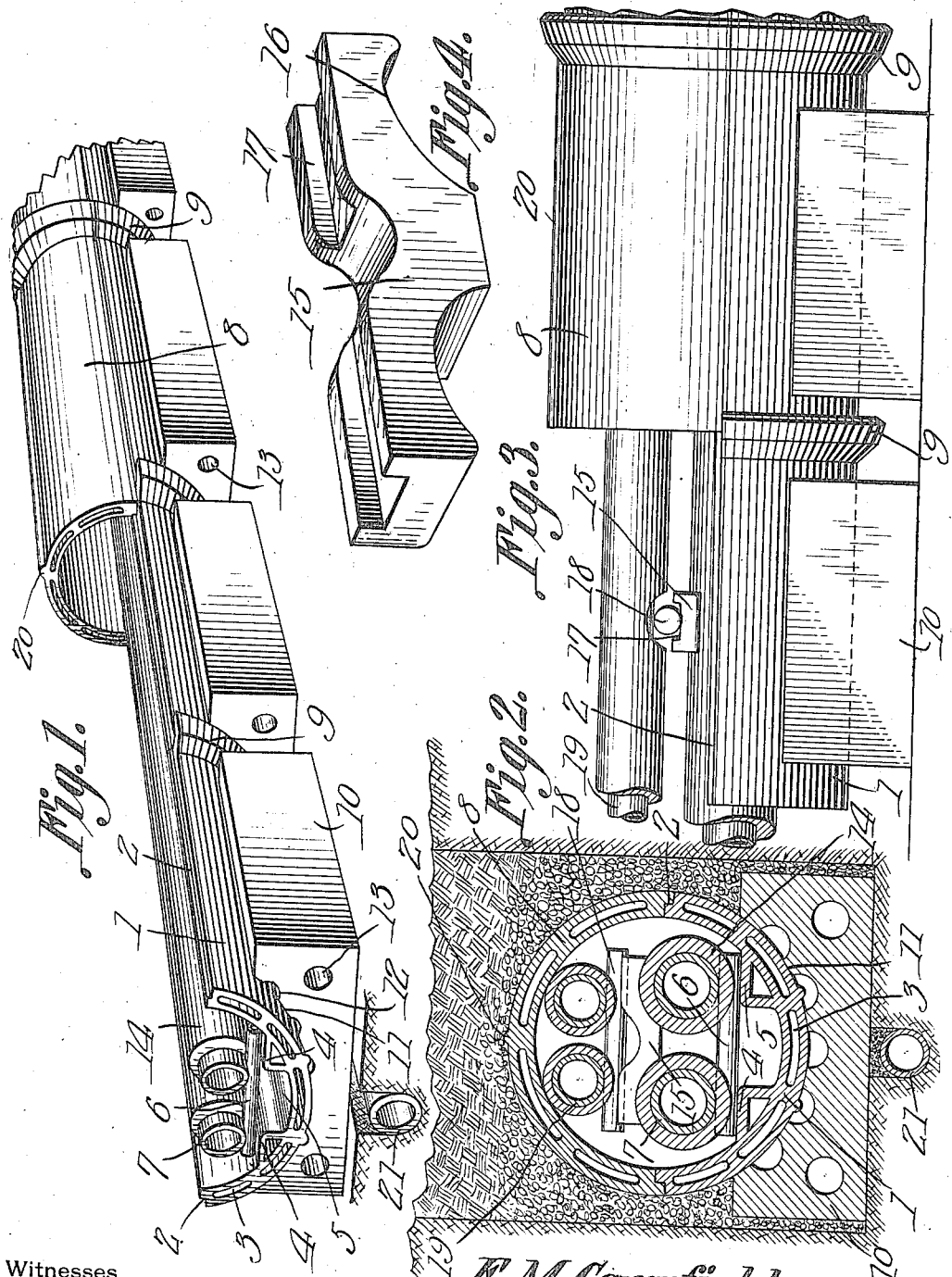

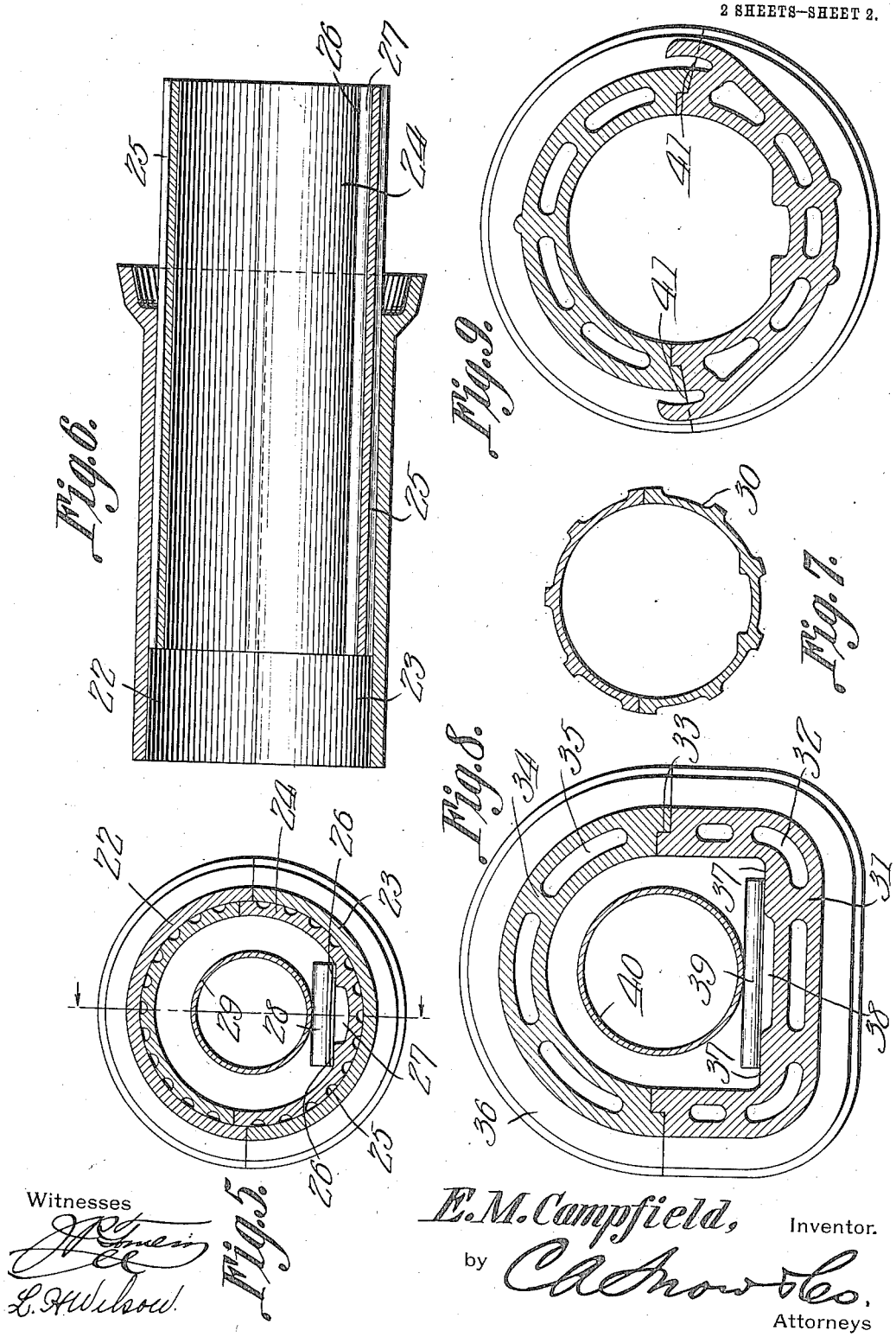

EDWIN M. CAMPFIELD, OF RICHMOND, INDIANA.

CONDUIT.

1,092,893.

Specification of Letters Patent.  Patented Apr. 14, 1914.

Application filed November 14, 1912. Serial No. 731,353.

*To all whom it may concern:*

Be it known that I, EDWIN M. CAMPFIELD, a citizen of the United States, residing at Richmond, in the county of Wayne and State of Indiana, have invented a new and useful Conduit, of which the following is a specification.

This invention relates to insulating conduits particularly designed for holding pipes containing hot or cold fluids, the object of the invention being to provide a conduit having an arrangement of air cells whereby loss of heat or cold by the contents of the conduit is reduced to the minimum.

A further object is to provide a conduit each section of which is made up of separable parts which can be readily assembled and which are so shaped as to prevent moisture from draining into the conduit at the joints.

A further object is to provide a conduit so constructed as to support rollers on which the fluid conducting pipes may be mounted.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

In said drawings:—Figure 1 is a perspective view of sections of the conduit embodying the present improvements and showing one way of mounting the same and of supporting pipes therein. Fig. 2 is an enlarged transverse section through the conduit. Fig. 3 is a side elevation of a portion of the structure shown in Fig. 1. Fig. 4 is a perspective view of a saddle designed to be used in connection with the pipes in the conduit. Fig. 5 is a transverse section through a modified form of conduit. Fig. 6 is a longitudinal section therethrough. Fig. 7 is a transverse section through a modified form of lining to be used in connection with the conduit. Fig. 8 is a transverse section through another form of conduit. Fig. 9 is a transverse section through another modification.

Referring to the figures by characters of reference 1 designates the bottom section of a cylindrical conduit, said section being provided, along its longitudinal edges, with rabbets 2 extending throughout the length of the section. Air cells or passages 3 also extend longitudinally within the wall of the section and are open at their ends. Opposed longitudinal ledges 4 are preferably formed upon the lower portion of the inner surface of section 1 and these ledges form a drain channel 5 between them and likewise constitute rests for the end portions of rollers 6 which may be utilized as supports for the pipes 7 housed within the conduit. The upper section 8 of the conduit is similar to the lower section with the exception that the same is not provided with ledges such as shown at 4, said ledges being, of course, unnecessary in the upper section. One end of each section is flared, as at 9, and the flared portions of the two sections coöperate to form a bell such as commonly formed at the end of a pipe or conduit section.

All parts of the conduit are formed of clay burned and vitrified or glazed, the sections of the conduit being so shaped as to be formed readily by means of a mold.

In using a conduit such as herein described, a foundation block, such as shown at 10, may be placed under each of the bottom sections of the conduit, these foundation blocks being provided with longitudinally extending recesses 11 in their upper faces for the reception of the bottom sections of the conduit. These recesses are formed with longitudinal channels 12 in the bottoms thereof and these channels constitute air cells. Additional passages or openings 13 may be formed in the blocks as shown in Figs. 1 and 2. It is to be understood that these foundation blocks are to be placed upon the bottom of the trench provided for the conduit and one of the sections 1 is placed on each block. Rollers 6 may then be placed on the ledges 4 after which the pipes 7, which may be provided with coverings 14 of insulating material, are placed on the rollers. The top sections of the conduit are then placed in position, as shown in Fig. 2, or, if desired, saddles 15 such as shown in detail in Fig. 4, may be placed on the pipes 7. Each of these saddles has oppositely extending bowed portions 16 adapted to bear downwardly on the pipes 7 and a channel 17 is formed longitudinally in the upper face of each saddle and is adapted to hold a roller 18 capable of moving transversely of the channel. These rollers 18 upon the various saddles can be used to support an upper set of pipes 19. Whether or not the upper pipes 19, the rollers 18, and the saddles 15 are used, the top sections 8 of the conduits are placed in position after the pipes have been properly located in the conduits and the several conduits are assembled so that one end of each conduit fits within the bell of the next adjoining conduit. The trench is then filled in with gravel or broken stone and dirt and the conduit thus becomes completely sealed. The air trapped within the cells 3, 12 and 13, serves to insulate the contents of the conduit, thus preventing the escape of heat or cold from the fluid contained within the pipes and obviating the necessity of wrapping the conduit with insulating material. By the use of conduits such as described, it has been found possible to convey hot or cold fluid through pipes which are not provided with coverings 14 and under such circumstances there has been little if any change in the temperature of the fluid during its passage through the pipes.

The rollers 6 and 18 of course permit the pipes to expand and contract without producing undesirable wear and tear upon the conduit.

As shown in the drawings, each section of each conduit may be provided with one or more reinforcing ribs 20 extending longitudinally thereof.

It is to be understood of course that when the various conduits are assembled, the corresponding cells in adjoining conduits register so that the completed structure has air cells extending continuously throughout the length of the structure.

The ribs 20 on the lower sections are so located as to project into certain of the channels 12 in the blocks 10 so that the sections are thus permitted to fit snugly on the blocks, those ribs in the channels serving not only to reinforce the sections longitudinally but also to hold the sections against rotation or lateral slipping relative to the blocks 10 while the conduit is being assembled.

As shown in Figs. 1 and 2 a drain pipe 21 may be located below the conduit and this can be connected at any desired point with the drain channel 5 within the conduit.

It is to be understood of course that various modifications of the structure hereinbefore described can be used without departing from the spirit of the present invention. For example, and as shown in Figs. 5 and 6, each conduit can be made up of upper and lower sections 22 and 23 the longitudinal edges of which are adapted to fit together snugly. These sections may be formed with solid walls and adapted to receive a cylindrical lining 24 likewise formed of upper and lower sections fitting together snugly. These sections are provided, in their outer faces, with longitudinal channels 25 and it will be apparent that when the lining sections are seated within the conduit so as to fit snugly against the inner surface of the conduit, these channels form separate air cells extending throughout the length of the conduit and having the same functions as the cells 3 hereinbefore described. Where a lining such as described is employed, the lower section is preferably extended through more than a one half circle so that the points of contact between the upper and lower sections of the lining will be out of alinement with the points of contact between the upper and lower sections of the conduit. As shown in Fig. 5, the lower section of the lining has opposed longitudinal ledges 26 forming a drain channel 27 between them and these ledges are adapted to support rollers, one of which is shown at 28 and on which a pipe, 29, may be mounted. The lining 24 is preferably extended beyond one end of the conduit 23 so that when two or more conduits are assembled, each lining will extend into two of the conduits and thus bridge the joint between said conduits and insure against leakage at the joint.

Although the cells are preferably made up of substantially semi-cylindrical channels or grooves formed in the outer surface of each lining section, it is to be understood that, if desired, broad channels, such as shown at 30 in Fig. 7, may be employed.

Under some conditions, it is desirable to utilize a conduit having a flat bottom portion. This form of device has been illustrated in Fig. 8. By referring to said figure it will be seen that the lower section 31 of the conduit has a flat bottom portion and upstanding parallel side walls, there being longitudinally extending air cells 32 within the bottom and walls. The upper edges of the walls are rabbeted as shown at 33 and are adapted to be engaged by a transversely arched upper section 34 having longitudinal air cells 35. A bell 36 may be formed at one end of this conduit so as to receive the end of the next adjoining conduit. The bottom section 32 has parallel ledges 37 forming a drain channel 38 between them, these ledges being adapted to support rollers 39 on which a pipe 40 may be supported. It will be noted that this pipe has been shown provided with a covering of any kind and, as hereinbefore stated, the use of a conduit having air cells in the walls thereof, as shown and described, obviates the necessity of utilizing such a covering.

In Fig. 9 a substantially cylindrical conduit has been shown, the same being provided, at its sides, with socket joints 41 whereby expansion and contraction of the material is permitted and leakage of water into the conduit is prevented.

Importance is attached to the fact that by utilizing a conduit such as has been described, hot or cold fluid can be conveyed from place to place and can be stored with no greater change in temperature than takes place in conduits which depend upon packing insulating material in the conduit or upon wrapping the pipes with insulating material. Consequently the cost of installing a conduit such as herein disclosed, and of preparing the pipes therein for use, is much less than that heretofore required in packing and housing pipes for like purposes.

While the conduit has been described as formed of upper and lower sections, it is to be understood that the same can be formed in a single piece if so desired. This construction is so obvious that it is not deemed necessary to enter into a detailed illustration or description thereof.

By utilizing the ledges in the bottom portions of the conduits, ordinary rollers can be employed for supporting the pipes and it becomes unnecessary to utilize rollers or brackets of special design.

What is claimed is:—

1. A conduit including upper and lower contacting sections having air cells in the walls thereof, the said sections coöperating at one end to form a bell, each section including a lining, the linings of the two sections projecting through and beyond the bell end of the conduit and there being spaced ledges within and integral with the bottom section of the lining and having a drain channel therebetween.

2. The combination with a conduit including upper and lower engaging sections, and spaced longitudinal ledges in the lower section and forming a drain channel therebetween, of rollers bearing at their ends upon the ledges, parallel pipes supported by the rollers, saddles bearing on the pipes and bridging the space therebetween, said saddles having longitudinal channels, rollers within said channels, and an upper pipe bearing directly on the last named rollers, all of said pipes being housed within the conduit and held against lateral displacement relative to the rollers by the wall of the conduit.

3. The combination with a conduit including upper and lower engaging sections, and spaced ledges in the lower section, of members bearing at their ends upon the ledges, pipes supported by said members, saddles bearing on the pipes and bridging the space therebetween, and an upper pipe supported by the saddles, all of said pipes being housed within the conduit and held against lateral displacement relative to each other by the wall of the conduit.

4. The combination with a foundation block having a transversely concaved upper face, and a longitudinal channel in said face, of a conduit contacting directly with and fitting snugly upon the concaved face to close the top of the channel, and a longitudinal reinforcing rib upon the conduit and extending throughout the length of the block, said rib extending into the channel and coöperating with the walls of said channel to hold the conduit against rotation relative to the foundation block.

In testimony that I claim the foregoing as my own, I have hereto affixed my signature in the presence of two witnesses.

EDWIN M. CAMPFIELD.

Witnesses:
I. B. ARNOLD,
R. E. FRYAR.